UNITED STATES PATENT OFFICE.

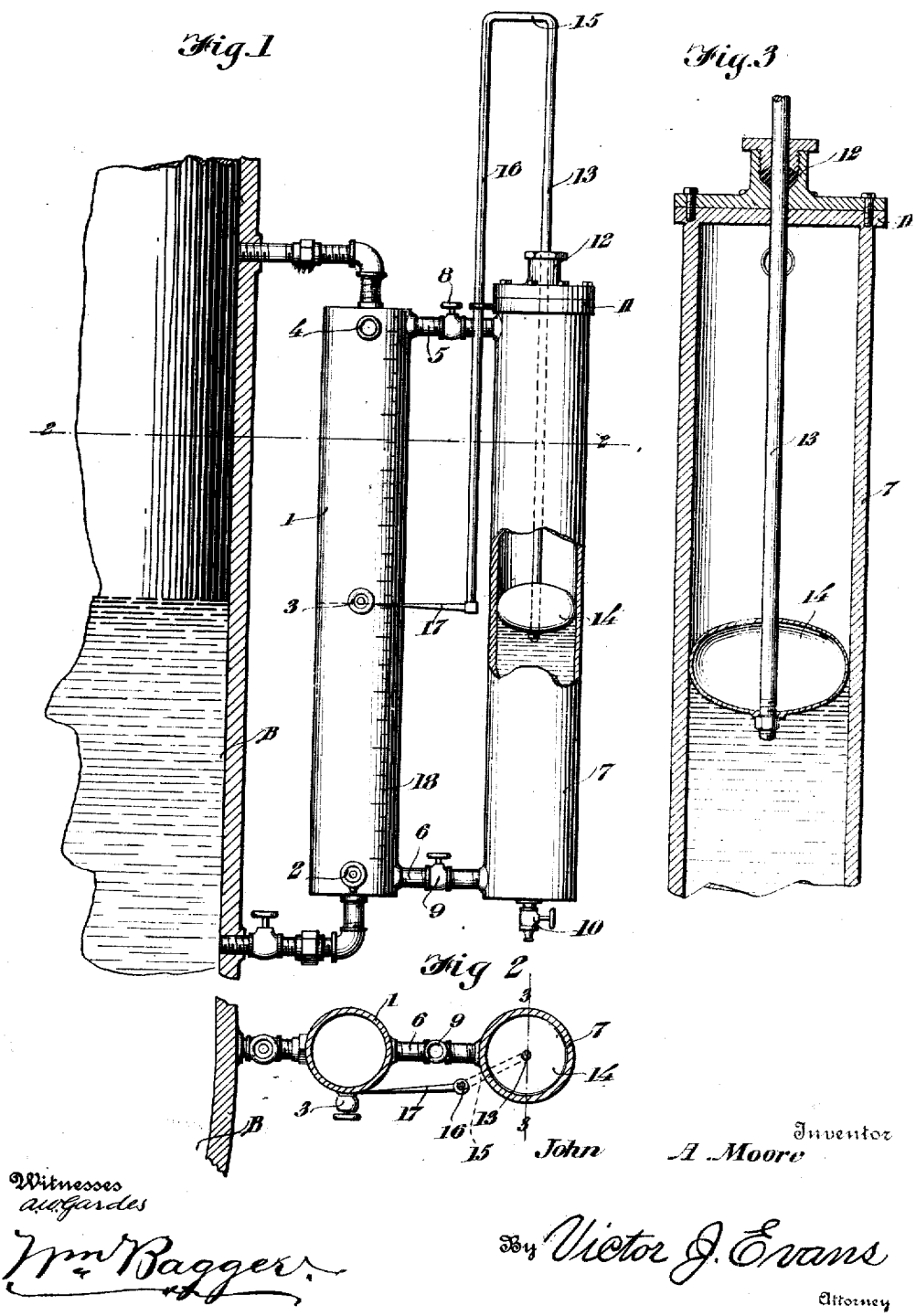
J. A. MOORE.
STEAM BOILER GAGE.
APPLICATION FILED MAY 6, 1911.
1,012,411. Patented Dec. 19, 1911.
Inventor
John A. Moore
Witnesses
By Victor J. Evans
Attorney

JOHN A. MOORE, OF WINSTON SALEM, NORTH CAROLINA.

STEAM-BOILER GAGE.

1,012,411.  Specification of Letters Patent.  Patented Dec. 19, 1911.

Application filed May 6, 1911. Serial No. 625,44r

*To all whom it may concern:*

Be it known that I, JOHN A. MOORE, a citizen of the United States, residing at Winston Salem, in the county of Forsyth and State of North Carolina, have invented new and useful Improvements in Steam-Boiler Gages, of which the following is a specification.

This invention relates to gages or water indicators for steam boilers, and the principal object of the invention is to provide a device of simple and improved construction by means of which the state of the water in the boiler may be accurately observed at any time, visually and without necessity for operating the gage cocks.

A further object of the invention is to produce a gage or indicator in the construction of which the use of glass or frangible material shall be avoided.

A still further object of the invention is to produce a gage or indicator of the class described in which a pointer movable over a graduated scale is actuated by a float, thus enabling the true state of the water level to be accurately ascertained at any time.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a partly sectional front view showing the device applied to a boiler in position for operation. Fig. 2 is a horizontal sectional view taken on the line 2—2 in Fig. 1. Fig. 3 is a vertical sectional view taken on the line 3—3 in Fig. 2.

Corresponding parts in the several figures are denoted by like characters of reference.

In carrying out this invention a metallic tube or cylinder 1 is connected with a boiler B in the manner of an ordinary gage glass, one end of said tube being connected with the steam space and the other end with the water space of the boiler. This tube or cylinder is equipped with gage cocks 2, 3 and 4 disposed, respectively, adjacent to the upper and lower ends and intermediate the ends, as shown. By means of these gage cocks the state of the water in the boiler may be tested in the usual well known manner.

Associated with the cylinder 1 by means of tubular connections 5 and 6 near the upper and lower ends, respectively, is a second tube or cylinder 7. The tubular connections 5 and 6 are provided with valves 8 and 9 whereby they may be obstructed when desired. When the valves 8 and 9 are opened it is obvious that water or steam and water, as the case may be, will pass from the tube or cylinder 1 to the tube or cylinder 7, in which latter the water will rise to the same level as in the tube 1 and in the boiler. The lower end of the cylinder 7 has a pet cock or try-cock 10.

The upper end of the cylinder 7 has a head 11 equipped with a gland or packing box 12 through which extends a rod 13, the lower end of which is attached to a float 14 within the cylinder. The parts are obviously to be so fitted together that the rod 13 will move freely through the gland, the weight of the float being sufficient to move the rod downwardly, while the buoyancy of said float must be sufficient to enable the rod to rise freely when water enters the tube or cylinder 7. The rod 13 is provided at its upper end with a lateral extension 15 having a downwardly extending arm 16 carrying a pointer 17 which coöperates with a scale 18 marked upon the surface of the tube or cylinder 1. The surface of the latter tube or cylinder is preferably coated or plated with bright metal, such as nickel, German silver or aluminum, material being preferably used which is not likely to corrode, but which will readily retain its brightness, thus enabling the scale to be easily read and the position of the pointer 17 to be very readily ascertained at any time even from some distance.

In the operation of this device, the pointer in connection with the graduated scale will at all times correctly indicate the state of the water in the boiler. When the water is low and the injector is put to work, the water as it rises will enter the tubes or cylinders 1 and 7, causing the float 14 to rise in the latter. As the water gradually becomes lowered in the boiler, it is obvious that the pointer will indicate that such is the case. Any variation, caused by varying steam pressure, has been found to be so slight as to be negligible.

In boilers, and especially in boilers where the pressure is heavy, glass gages are undesirable for the reason that they are very likely to be broken or blown out, thus necessitating repairs and temporarily interfering with the usefulness of the boiler. Another serious objection is that the gage glass, if the water is at all muddy or contains much sediment, will soon become clogged or obscured to such an extent as to make it impossible to observe the state of the water level visually. It then becomes necessary to depend upon the gage cocks for ascertaining the state of the water or else to clean and brighten the gage glass, an operation which necessitates its removal and consequent loss of time. These and other disadvantages are overcome by the present invention which, as will be seen, is simple in construction, certain in its operation and very easily applied to any boiler in place of the old fashioned gage glass.

Having thus described the invention, what is claimed as new, is:—

1. In a boiler gage, a gage tube associated with the boiler and having gage cocks and an indicating scale, an auxiliary tube, valved ducts connecting the auxiliary tube with the upper and lower ends of the gage tube, a head at the upper end of the auxiliary tube having a gland, a float within the auxiliary tube, a rod associated with the float and extending through the gland, said rod being provided at its upper end with a lateral extension having a downwardly extending arm, and a pointer carried by said arm.

2. In a boiler gage, a gage tube associated with the boiler and having gage cocks, said tube having a coating of bright and non-corrodible material and an indicating scale inscribed thereupon, an auxiliary tube, valved ducts connecting the upper and lower ends of the auxiliary tube with the upper and lower ends of the gage tube, a head constituting a closure for the upper end of the auxiliary tube and having a gland, a float within the auxiliary tube, a rod associated with the float, extending upwardly through the gland and having at its upper end a lateral extension provided with a downwardly extending arm, and a pointer carried by said arm and coöperating with the scale inscribed upon the gage tube.

In testimony whereof I affix my signature in presence of two witnesses.

JOHN A. MOORE.

Witnesses:
W. E. FRANKLIN,
J. P. HURDLE.